(12) United States Patent
Yang

(10) Patent No.: US 7,450,526 B2
(45) Date of Patent: Nov. 11, 2008

(54) CONFIGURING DIRECTION-BASED CORE BASED TREE (CBT) FOR CBT-BASED OVERLAY MULTICAST

(75) Inventor: Ki-Seon Yang, Suwon (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 847 days.

(21) Appl. No.: 10/800,775

(22) Filed: Mar. 16, 2004

(65) Prior Publication Data

US 2004/0196795 A1    Oct. 7, 2004

(30) Foreign Application Priority Data

Mar. 28, 2003    (KR) .................. 10-2003-0019718

(51) Int. Cl.
*H04L 12/28* (2006.01)
(52) U.S. Cl. .................. 370/255; 370/254; 370/256
(58) Field of Classification Search .......... 370/254, 370/390, 238, 351; 709/224, 238, 242, 201, 709/240, 241, 351
See application file for complete search history.

(56) References Cited

U.S. PATENT DOCUMENTS

| | | | |
|---|---|---|---|
| 5,331,637 A * | 7/1994 | Francis et al. ............ 370/408 |
| 6,078,590 A | 6/2000 | Farinacci et al. |
| 6,321,270 B1 | 11/2001 | Crawley |
| 6,611,528 B1 | 8/2003 | Farinacci et al. |
| 6,611,872 B1 | 8/2003 | McCanne |
| 6,625,773 B1 | 9/2003 | Boivie et al. |
| 6,917,985 B2 * | 7/2005 | Madruga et al. ............ 709/238 |
| 7,080,157 B2 * | 7/2006 | McCanne ................... 709/238 |
| 2002/0091846 A1 | 7/2002 | Garcia-Luna-Aceves et al. |
| 2002/0143951 A1 | 10/2002 | Khan et al. |
| 2003/0005149 A1 | 1/2003 | Haas et al. |
| 2003/0058857 A1 | 3/2003 | Maher et al. |
| 2003/0088696 A1 | 5/2003 | McCanne |
| 2003/0185209 A1 | 10/2003 | Lee |
| 2003/0195964 A1 | 10/2003 | Mane |
| 2004/0139150 A1 * | 7/2004 | McCanne et al. ............ 709/202 |

* cited by examiner

*Primary Examiner*—Huy D. Vu
*Assistant Examiner*—David Oveissi
(74) *Attorney, Agent, or Firm*—Robert E. Bushnell, Esq.

(57) ABSTRACT

Configuring a direction-based Core Based Tree (CBT) for an overly multicast includes: requesting and receiving from an arbitrary terminal node information on a child node pre-subscribed to a core node; calculating a direction between the arbitrary terminal node and each of the received child nodes, to transmit information to the core node on the child node having a minimum resultant value along with a subscription request message; receiving the subscription request message and the child node information, and comparing a resultant direction calculation value of the corresponding child node and terminal node with a resultant direction calculation value between the pre-subscribed child nodes and allowing the terminal node to subscribe to a child node or a parent node to configure the CBT; and, periodically transmitting and receiving a hello packet between the core node and the terminal node, and among the parent-, child and brother nodes.

10 Claims, 18 Drawing Sheets ac + ha ≤ hc hc + ac ≥ ha

CONFIGURING DIRECTION-BASED CORE BASED TREE (CBT) FOR CBT-BASED OVERLAY MULTICAST

CLAIM OF PRIORITY

This application makes reference to, incorporates the same herein, and claims all benefits accruing under 35 U.S.C. §119 from an application for CONFIGURATION METHOD OF DIRECTION-BASED CBT FOR CBT-BASED OVERLAY MULTICAST earlier filed in the Korean Intellectual Property Office on 28 Mar. 2003 and thereby duly assigned Serial No. 2003-19718.

BACKGROUND OF THE INVENTION

1. Field of the Invention

The present invention relates to a method of configuring a direction-based Core Based Tree (CBT) for a CBT-based overlay multicast.

2. Description of the Related Art

Generally, when one intends to transmit the same information to several receivers, one-to-many communication for transmitting data only to receivers participating in a corresponding multicast group through a multicast is more efficient than a unicast, i.e., one-to-one communication, since the one-to-many communication can reduce receiving side latency, use of network resources, and transmission overhead of a transmitter.

However, in an Internet Protocol (IP) multicast performed over a network, the network must be configured using a multicast router for relaying data according to a multicast routing algorithm.

Accordingly, there is a drawback in that a new investment cost is required for replacing a conventional unicast router with the multicast router.

On the other hand, on an Internet Service Provider's (ISPs') side, due to a low investment profit caused by the absence of a multicast service profit model and also on a technical side, due to a negotiation and a policy for passing through a multicast traffic between Session Initiation Protocols (SIP), a fairness with a conventional unicast traffic, and a still unclear inter-domain multicast technology, etc., the introduction of multicast has been delayed in an ISP backbone network.

Meanwhile, private and local multicast requests have rapidly increased, foe example, company broadcasting and campus broadcasting, etc. using the Internet. Accordingly, there is a need for multicast transmission based on a current unicast network.

An overlay multicast for relaying data in a terminal node is one method for a unicast-network-based multicast transmission. Due to a recent rapid improvement in data processing speed and a rapid improvement in data transmission speed in accordance with the increase of memory capacity and the spread of VDSL, etc., the terminal node performs the relay of data to other terminal nodes so that an efficient overlay multicast can be expected.

FIG. 1A illustrates a network configuration for performing an Internet Protocol (IP) multicast using a multicast router, and FIG. 1B illustrates a network configuration performing an overlay multicast using a unicast router.

A basic concept of the overlay multicast is that, instead of performing the multi cast over the network consisting of multicast routers (MR1-MR4) as shown in FIG. 1A, it can perform a unicast-based multicast by relaying (transmitting after copying) a packet in the terminal node (host) such as a node B in the network consisting of unicast routers (R1-R4) as shown in FIG. 1B. That is, the terminal node can perform a role of the multicast router.

In comparison with the multicast performed over the network of FIG. 1A, the overlay multicast performed over the network of FIG. 1B increases delay time or number of packets, but it does not need the multicast router, thereby providing a relatively efficient multicast communication based on the conventional unicast network.

Research is now progressing on an overlay multicast protocol, a distance vector multicast routing protocol (DVMRP), a narada to which the multicast routing protocol is applied, installing a scattercast proxy on the network to use the unicast communication between proxies, and CBT.

A core of such an overlay multicast is that an overlay tree for an efficient packet transmission is configured and maintained using terminal nodes included in the same multicast group.

On the other hand, the CBT to which a shared tree is applied is more efficient than the DVMRP to which a multicast routing protocol is applied, in an extension, an overhead of a control message, and performance.

That is, the CBT has a disadvantage in that traffic is converged on the core node, but has advantages in that relatively fewer control messages are generated for a variation of a multicast member and in that the quantity of information managed in each of the terminal nodes becomes smaller, to make an extension better and to make its realization easier. Further, since, in proportion to an improvement in the processing speed of the terminal node and an improvement in data transmission capacity, the number of relay-able child nodes is increased to improve performance of an overall multicast, thereby making the CBT-based overlay tree configuration more efficient.

The CBT-based overlay multicast basically selects a node to which a node-to-node distance comes close as a parent or a child node to configure the CBT. In the CBT metrically measuring the distance, a procedure of relaying packets to all nodes on the CBT is performed so that it repetitively passes the packets to a specific link or router, thereby causing traffic to be converged on the corresponding link or router to bring about congestion.

Generally, since the multicast is operated according to a user datagram protocol (UDP) not having a congestion control mechanism, unlike a transmission control protocol (TCP), even when congestion is generated on the network, the packet can continuously be transmitted to the network without reducing the quantity of traffic. As a result, there are drawbacks in that network performance as well as multicast performance can deteriorate due to the packet loss and in that an unfair problem with other TCP connections on the network can be caused.

The following patents each discloses features in common with the present invention but do not teach or suggest the inventive features disclosed in the present application: U.S. Patent Publication No. 2003/0088696 to McCanne, entitled PERFORMING MULTICAST COMMUNICATION IN COMPUTER NETWORKS BY USING OVERLAY ROUTING, published on May 8, 2003; U.S. Patent Publication No. 2003/0195964 to Mane, entitled MANAGING MULTICAST SESSIONS, published on Oct. 16, 2003; U.S. Patent Publication No. 2003/0185209 to Lee, entitled SCALABLE IP MULTICAST WITH EFFICIENT FORWARDING CACHE, published on Oct. 2, 2003; U.S. Patent Publication No. 2003/0058857 to Maher et al., entitled MULTICAST IP ZONES FOR FAST SPANNING TREE CONVERGENCE IN WIDE-AREA PACKET NETWORK SYSTEMS, published on Mar. 27, 2003; U.S. Patent Publication No. 2003/0005149 to Haas et al,. Entitled INDEPENDENT-TREE AD HOC MULTICAST ROUTING, published on Jan. 2, 2003; U.S. Patent Publication No. 2002/0091846 to Garcia-Luna-Aceves et al., entitled TREE-BASED ORDERED MULTI-CASTING METHOD, published on Jul. 11, 2002; U.S. Patent Publication No. 2002/0143951 to Khan et al., entitled METHOD AND SYSTEM FOR MULTICAST TO UNI-CAST BRIDGING, published on Oct. 3, 2002; U.S. Pat. No. 6,625,773 to Boivie et al., entitled SYSTEM FOR MULTI-CAST COMMUNICATIONS IN PACKET SWITCHED NETWORKS, issued on Sep. 23, 2003; U.S. Pat. No. 6,611,528 to Farinacci et al., entitled HIERARCHICAL ROUTING KNOWLEDGE FOR MULTICAST PACKET ROUTING, issued on Aug. 26, 2003; U.S. Pat. No. 6,321,270 to Crawley, entitled METHOD AND APPARATUS FOR MULTICAST ROUTING IN A NETWORK, issued on Nov. 20,2001; U.S. Pat. No. 6,078,590 to Farinacci et al., entitled HIERARCHI-CAL ROUTING KNOWLEDGE FOR MULTICAST PACKET ROUTING, issued on Jun. 20, 2000; and U.S. Pat. No. 6,611,872 to McCanne, entitled PERFORMING, MUL-TICAST COMMUNICATION IN COMPUTER NET-WORKS BY USING OVERLAY ROUTING, issued on Aug. 26, 2003.

SUMMARY OF THE INVENTION

Therefore, the present invention has been made in view of the above problems, and it is an object of the present invention to provide a method of configuring a direction-based CBT for a CBT-based overlay multicast, which can solve the problem that traffic is converged on a specific router and link.

In accordance with one aspect of the present invention, the above and other objects can be accomplished by the provision of a method of configuring a direction-based CBT for a CBT-based overly multicast, the method including: requesting and receiving an arbitrary terminal node which intends to sub-scribe to the CBT of information on a child node pre-sub-scribed to a core node; calculating a direction between the arbitrary terminal node receiving information on the child node from the core node and each of the received child nodes, to transmit information on the child node of the core node having a minimum resultant value along with a subscription request message to the core node; receiving the subscription request message transmitted from the terminal node and the child node information by the core node, and comparing a resultant direction calculation value of the corresponding child node and terminal node with a resultant direction cal-culation value between the pre-subscribed child nodes so that depending on the compared result, the terminal node is allowed to subscribe to the child node or a parent node of the corresponding child node to configure the CBT; and allowing the core node and the terminal node to periodically transmit and receive a hello packet to and from the parent child, and brother nodes, to confirm a state of the corresponding node and to reconfigure the configured CBT according to the con-firmed state.

As described above, the present invention analyzes a trans-mission forward direction of packets transmitted from a core node to each node to select a node having the same forward direction as a parent or child node in a CBT, thereby solving the return problem in a distance-metric-based CBT.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1A:
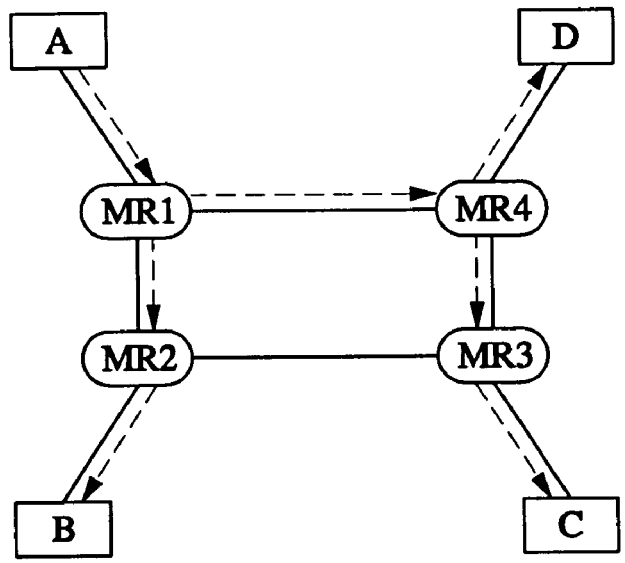
FIG. 1A is a view illustrating a network configuration for performing an Internet Protocol (IP) multicast using a multi-cast router.
Figure 1B:
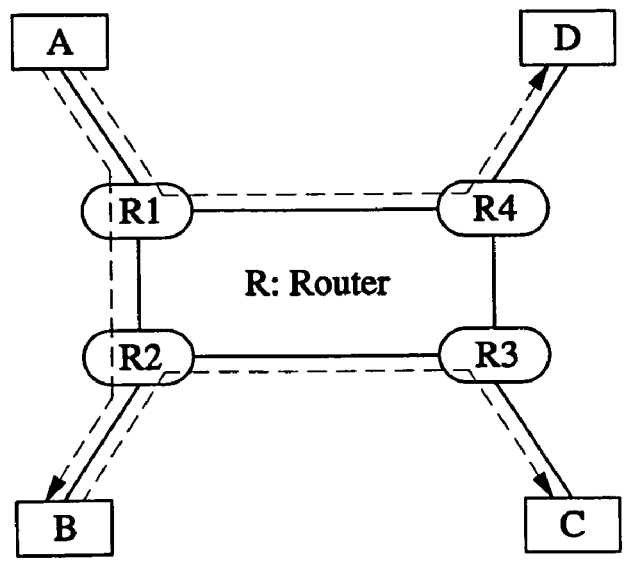
FIG. 1B is a view illustrating a network configuration for performing an overlay multicast using a unicast router.
Figure 2:
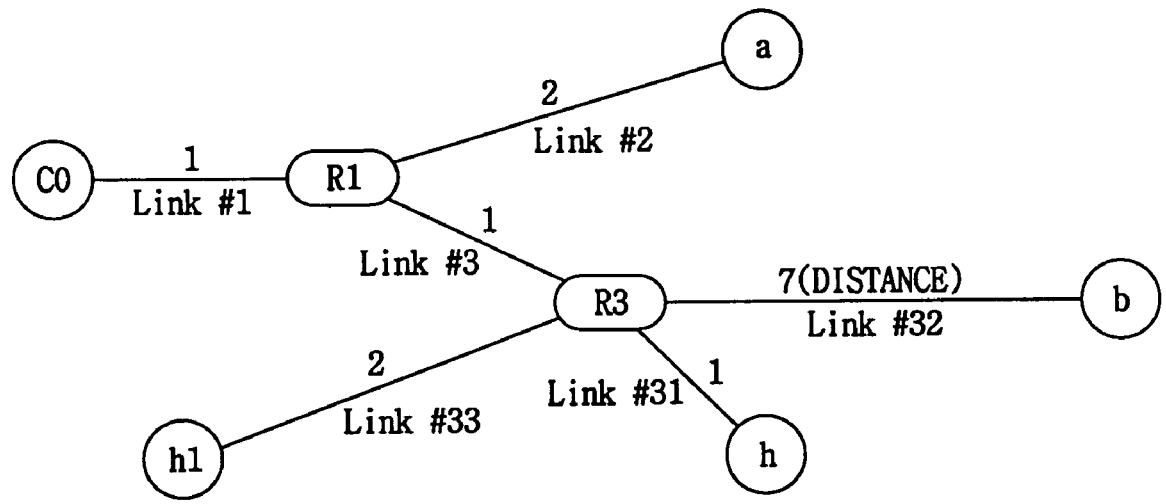
FIG. 2 is a view illustrating a network topology consisting of nodes included in the same multicast group.

FIG. 2 illustrates an example of a network topology con-sisting of nodes included in the same multicast group, wherein each of the nodes subscribes in a sequence of nodes a, b, h and h1.

Referring to FIG. 2, a core node C0 is connected to a router1 R1 through a link #1, and the node a is connected to the router 1 R1 through a link #2. The router1 R1 is connected to the router3 R3 through a link #3, and the node b is connected to the router3 R3 through a link #32. The node h is connected to the router3 R3 through a link #31, and the node h1 is connected to the router3 R3 through a link #33.

FIGS. 3A to 3D are views for describing the case of subscribing in a sequence of the nodes a, b and h depending on the distance-metric-based CBT having the core node C0 in the network topology of FIG. 2.

Figure 3A:
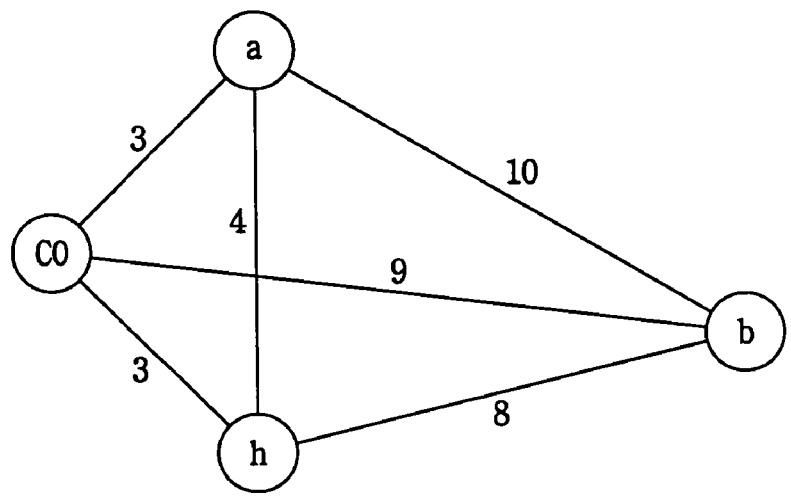
FIGS. 3A to 3D are views for describing the case of sub-scribing in a sequence of nodes a, b and h depending on a distance-metric-based CBT having a core node C0 in a net-work topology of FIG. 2.

FIG. 3A illustrates each node-to-node distance in the case of subscribing in a sequence of the nodes a, b and h depending on the distance-metric-based CBT having the core node C0 in the network of FIG. 2. The distance between the core node C0 and the node a is 3, the distance between the core node C0 and the node b is 9, the distance between the node a and the node h is 4, the distance between the node h and the node b is 8, and the distance between the node a and the node b is 10.

That is, since the core node C0 is connected to the node a passing through the router 1 R1 via the link #1, and then via the link #2, when the distance 1 of the link #1 and the distance 2 of the link #2 are summed up, a total distance is 3.

Since the core node C0 is connected to the node b passing through the router 1 R1 via the link #1, and then passing through the router 3 R3 via the link #3, and finally, via the link #32, when a distance 1 of the link #1, a distance 1 of the link #3 and a distance 7 of the link #32 summed up, a total distance is 9.

Since the node a is connected to the node h passing through the router 1 R1 via the link #2, and then passing through the router 3 R3 via the link #3 and, and finally, via the link #31, when a distance 2 of the link #2, the distance 1 of the link #3 and a distance 1 of the link #31 are summed up, a total distance is 4.

Since the node h is connected to the node b passing through the router 3 R3 via the link #31, and then via the link #32, when the distance 7 of the link #32 and the distance 1 of the link #31 are summed up, a total distance is 8.

Since the node a is connected to the node b passing through the router 1 R1 via the link #2, and then passing through the router 3 R3 via the link #3, and finally, via the link #32, when the distance 2 of the link #2, the distance 1 of the link #3 and the distance 7 of the link #32 are summed up, a total distance is 10.

Here, the node-to-node distance uses an end-to-end latency for an exchange of a query and a response.

Figure 3B:
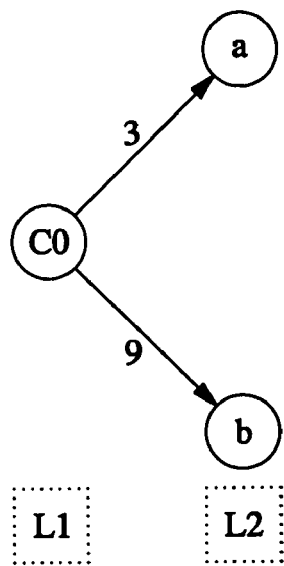
Figure 3C:
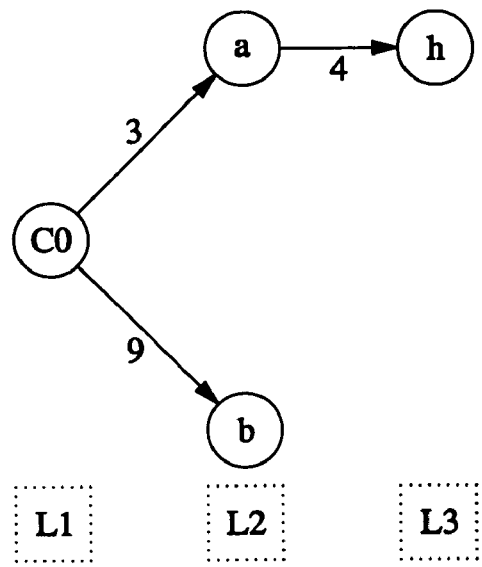

Referring to FIG. 2 and FIG. 3A, in case the number of the relay-able (house-able) child nodes of the core node C0 is two, as shown in FIG. 3B, first, in a state in which the nodes a and b subscribe, since the distance between the node h and the node a is 4 and the distance between the node h and the node b is 8, the node a is selected as the parent node for subscription to configure the CBT of FIG. 3C.

Figure 3D:
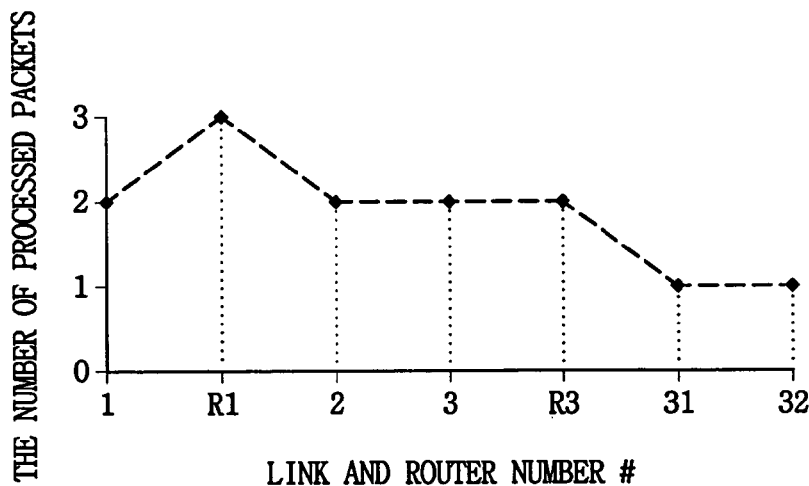

FIG. 3D illustrates the number of the packets processed on each of the links and the routers in the process of relaying one multicast packet from the core node to the overall CBT.

That is, since the network to pology of FIG. 2 has the distance as shown in FIG. 3A, when the distance-based CBT processed as in FIG. 3B and FIG. 3C is configured, the number of the packets processed on each of the links and routers is as follows.

In order to transmit the packet from the core node C0 to each of the nodes a, b and h, the packet can be transmitted from the core node to the node a and the node b, and then to the node h, with the packet being relayed through the node a.

That is, describing a packet transmission path from the core node C0 to the node a with reference to FIG. 2, the path from the core node C0 to the node a is drawn passing through the router 1 R1 via the link #1, and then via the link #2 (link #1, R1, link #2).

Describing the packet transmission path from the core node C0 to the node b, the path from the core node C0 to the node b is drawn passing through the router 1 R1 via the link #1, and then passing through the router 3 R3 via the link #3, and finally, via the link #32 (link #1, R1, link #3, R3, link #32).

Describing a packet transmission path from the node a to the node h, the path from the node a to the node h is drawn passing through the router 1 R1 via the link #2, and then passing through the router 3 R3 via the link #3, and finally, via the link #31 (link #2, R1, link #3, link #31).

Accordingly, calculating packet passage times by each link or router, the link #1 has two times, the router 1 R1 has three times, the link #2 has two times, the link #3 has two times, the router 3 R3 has two times, the link #31 has one time, and the link #32 has one time.

That is, in order to transmit the N number of the multicast packets to the overall CBT, on the router 1 R1 is processed the 3*N number of packets.

Figure 4:
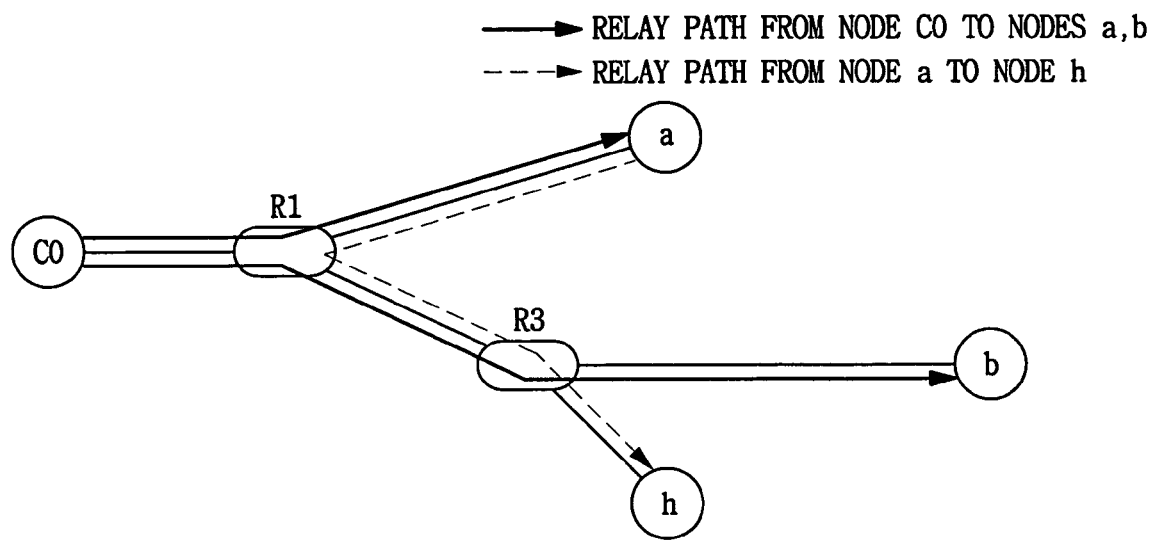
FIG. 4 is a view illustrating a relay path of a multicast packet in a CBT of FIG. 3C.

The reason that the packets are converged on the router 1 R1 than other links or routers is that, as shown in FIG. 4, in comparison with a path (solid line arrow) relaying the packet from a first hierarchy node C0 to the node a and the node b through the router 1 R1, a path (dotted line arrow) relaying the packet from a second hierarchy node a to the node h returns through the router1 R1.

That is, as shown in the solid line arrow, when relaying from the core node C0 to the node a and the node b, the packets must pass through the router 1 R1 once by each, and as shown in the dotted line arrow, even when relaying from the node a to the node b, the packets must pass through the router 1 R1 and the router 3 R3, to pass through the router 1 R1 three times in total.

Figure 5A:
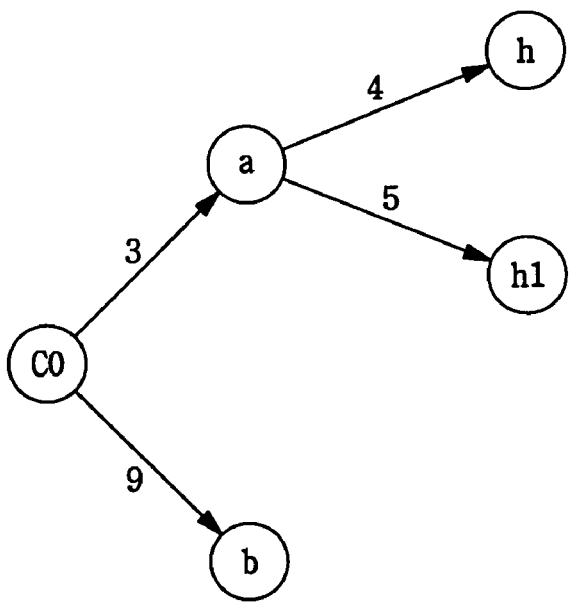
FIG. 5A is a view illustrating a configuration of a distance-metric-based CBT consisting of nodes C0, a, b, h and h1.
Figure 5B:
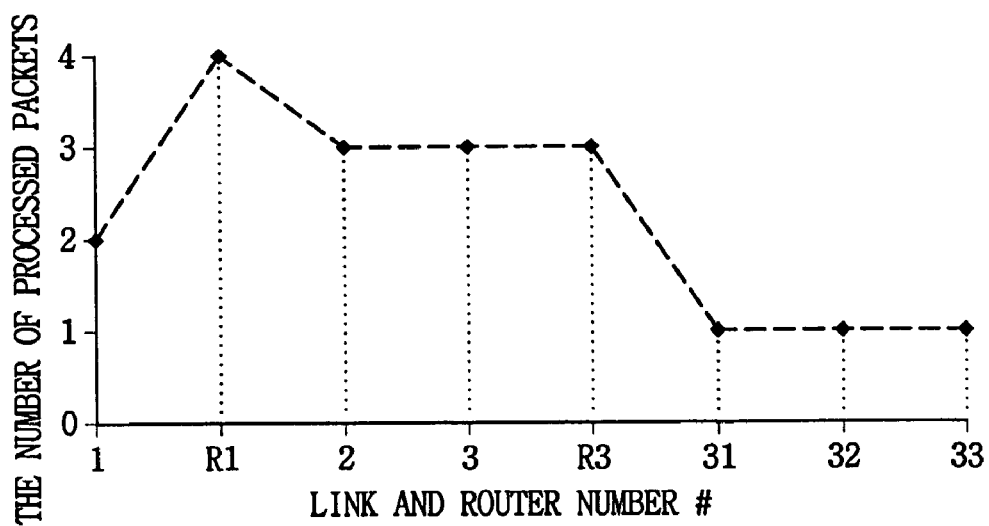
FIG. 5B is a graph illustrating the number of packets pro-cessed on each of links and routers in a network of FIG. 5A.

FIG. 5A illustrates the distance-metric-based CBT consisted of nodes C0, a, b, h and h1 in the network topology shown in FIG. 2. The node h1 selects the node a as the parent node for subscription. FIG. 5B is a graph illustrating the number of packets processed on each link and router in the network of FIG. 5a. Referring to FIG. 5B, the link #1 processes two packets, the router 1 R1 processes four packets, the link #2 processes three packets, the link #3 processes three packets, the router 3 R3 processes three packets, the link #31 processes one packet, the link #32 processes one packet and the link #33 processes one packet.

That is, since the network topology of FIG. 2 has the distance shown in FIG. 3A, when the distance-based CBT having the process as in FIG. 5A is configured, the number of the packets processed on each of the links and routers is as follows.

In order to transmit the packet from the core node C0 to each of the nodes a, b, h and h1, the packet can be transmitted from the core node to the node a and the node b, and then to the nodes h and h1, with the packet being relayed through the node a.

That is, describing a packet transmission path from the core node C0 to the node a with reference to FIG. 2, the path from the core node C0 to the node a is drawn in passing through the router 1 R1 via the link #1, and then via the link #2 (link #1, R1, link #2).

Describing the packet transmission path from the core node C0 to the node b, the path from the core node C0 to the node b is drawn in passing through the router 1 R1 via the link

1, and then passing through the router3 R3 via the link #3, and finally, via the link #32 (link #1, R1, link #3, R3, link #32).

Describing a packet transmission path from the node a to the node h, the path from the node a to the node h is drawn in passing through the router 1 R1 via the link #2, and then passing through the router 3 R3 via the link #3, and finally, via the link #31 (link #2, R1, link #3, link #31).

Describing a packet transmission path from the node a to the node h1, the path from the node a to the node h1 is drawn in passing through the router 1 R1 via the link #2, and then passing through the router 3 R3 via the link #3, and finally, via the link #33 (link #2, R1, link #3, link #33).

Accordingly, calculating the packet passage times by each link or router, the link #1 has two times, the router 1 R1 has four times, the link #2 has three times, the link #3 has three times, the router 3 R3 has three times, the link #31 has one time, the link #32 has one time, and the link #33 has one time.

As shown in FIG. 5A and FIG. 5B, when the return times passing through the router 1 R1 are increased due to a subscription of a new node, the congestion problem can be caused on the router 1 R1.

As described above, the distance-metric-based CBT has a drawback in which the congestion is caused according to a subscription sequence. In particular, in case the congestion is caused on the router or link connected to the core node, such as the router 1 R1, it can strike a fatal blow against the overall CBT.

As mentioned above, the drawback in the conventional distance-metric-based CBT is caused by selecting the parent or child node simply only with the node-to-node distance to configure the CBT without considering the relay path of the multicast packets transmitted to sub (child) nodes in the tree.

First, an attribute of a direction-metric-based CBT according to an embodiment of the present invention will be defined.

Table 1 shows the defined attribute of the direction-metric-based CBT according to an exemplary embodiment of the present invention.

TABLE 1

| notation | Description |
| --- | --- |
| C(x) | Child set of node x |
| num(C(x)) | The number of child nodes of node x |
| max(C(x)) | The number of child nodes which node x can house (relay) to the maximum |
| Pi(x) | $i^{th}$ ancestor node of node x (i > 0) |
| dist(x, y) | Distance between node x and node y |
| C0 | Core node |
| h | New node desiring subscription to CBT |
| Nx, Ny | Node already subscribed to CBT |
| p(x, y) | Node adjacent to core node between node x and node y<br>p(x, y) ← x, if dist(C0, x) < dist(C0, y) |
| c(x, y) | Node distant from core node between node x and node y<br>p(x, y) ← y, if dist(C0, x) < dist(C0, y) |
| atan( ) | Calculating arctangent value with radian value |
| sqrt( ) | Returning square root value |
| PI | Pi(π)value(≈3.14195926) |
| WhoisChild(x) | Requesting node x information on child of x |
| Direction(x, y) | Calculating direction value between node x and node y |

Referring to Table 1, "C(x)" is a child node set of a node x, "num(C(x))" is the number of the child nodes of the node x, "max(C(x))" is the number of the child nodes which the node x can house (relay) to the maximum, and "Pi(x)" is $i^{th}$ ancestor node of the node x (i>0). "dist(x,y)" represents a distance between node x and node y, "C0" represents a core node, "h" represents a new node which desires to subscribe to a CBT, and "Nx" and "Ny" represent nodes pre-subscribed to the CBT.

"p(x,y)" represents a node adjacent to the core node between the node x and the node y, and for example, when a distance (dist(C0,x)) between the core node and the node x is less than a distance (dist(C0,y)) between the core node and the node y, the p(x,y) becomes x.

On the other hand, "c(x,y)" represents a node distant from the core node in the nodes x and y, and for example, when a distance (dist(C0,x)) between the core node and the node x is less than a distance (dist(C0,y)) between the core node and the node y, the c(x,y) becomes y. "atan()" represents a calculation of an arctangent value with a radian value, "sqr( )" represents a square root return, "PI" represents a pi(p) value (≈3.1415926), "WhoisChild(x)" represents requesting the node x of information on its child node x, and "direction(x,y)" represents a calculation of the direction value between the node x and the node y.

FIG. 6A to FIG. 6D illustrate a positional relationship between two adjacent nodes based on the core node according to an exemplary embodiment of the present invention.

Figure 6A:
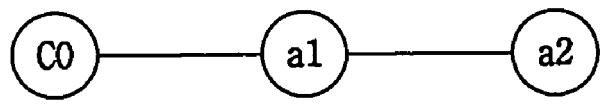
FIGS. 6A to 6D are views illustrating a positional relation-ship between two adjacent nodes based on a core node.
Figure 6B:
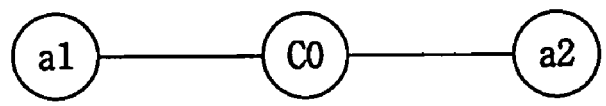
Figure 6C:
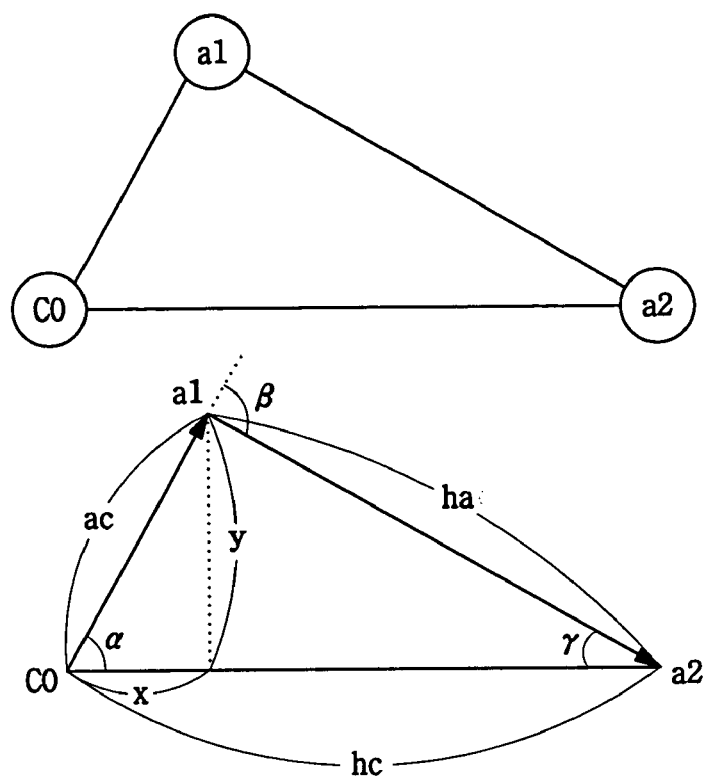
Figure 6D:
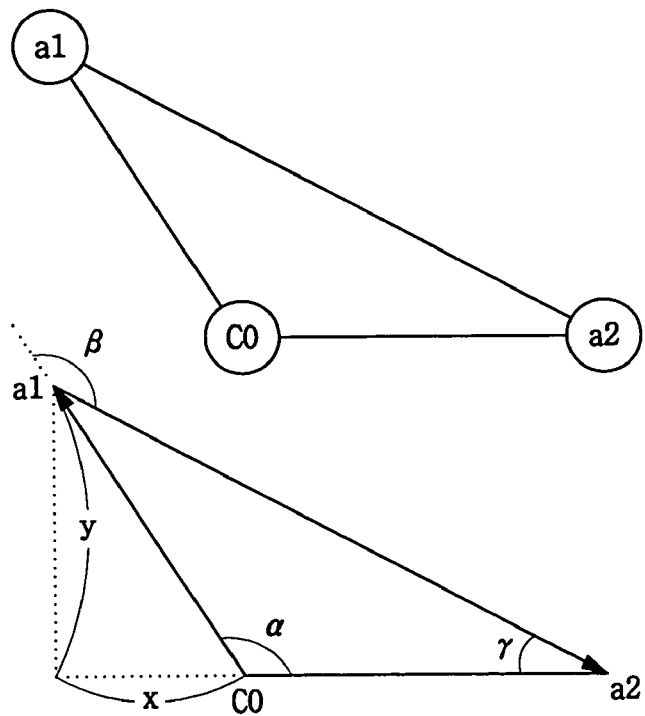

FIG. 6A illustrates a connection having a sequence of the core node C0, node a1 and node a2, and FIG. 6B illustrates a connection having a sequence of the node a1, the core node C0 and the node a2. As shown in FIG. 6C and FIG. 6D, it can be assumed that a triangle has the distance between two nodes adjacent to the core node as a side. Internal and external angles and a height of the triangle are used to obtain the forward direction of the packets relayed between the nodes.

A direction calculation algorithm according to an embodiment of the present invention can be expressed as follows.

```
Procedure: direction (a1, a2)
hc ← dist( C0, c(a1, a2))
ac ← dist( C0, p(a1, a2))
ha ← dist( a1,a2)
if (hc + ac ≧ ha)
    return ∞
else if (ac + ha ≦ hc)
    return 0
end if
x ← ((hc*hc)+(ac*ac)−(ha*ha)/(2*hc)
y ← sqrt(ac*ac − x*x)   //calculating height
if (x > 0)
    α ← atan(y/x)*(180/PI)
else
    α ← 180 − atan(y/−x)*(180/PI) //converting radian value into angle
end if
γ ← atan(y/(hc−x))*(180/PI)
β ← α + γ
return ( α + β)*y //resultant value of direction(a1, a2)
```

That is, it is assumed that a distance between a node distant from the core node C0 in the node a1 and the node a2 and the core node C0 corresponds to "hc", a distance between a node adjacent to the core node C0 in the node a1 and the node a2 and the core node C0 corresponds to "ac", and a distance between the node a1 and the node a2 corresponds to "ha".

First, as in FIG. 6A, in case of an expression of "ac+ha≦hc", a return value 0 is outputted, and as in FIG. 6B, in case of an expression of "hc+ac ≧ha", a return value ∞ is outputted.

On the other hand, in FIG. 6C or FIG. 6D, an expression of "((hc*hc)+(ac*ac)−(ha*ha)/(2*hc)" becomes x and an expression of "sqrt(ac*ac−x*x)" becomes y to calculate the height(y).

As in FIG. 6C, when "x>0", then "atan(y/x)*(180/PI)" becomes equal to a, and as in FIG. 6D, when "x<0", then "180−atan(y/−x)*(180/PI)" becomes equal to a, to convert the radian value into an angle.

Next, "atan(y/(hc−x))*(180/PI)" becomes equal to γ, and "α+γ" becomes equal to β, to return a value of "(α+β)*y" as a resultant value of "direction(a1, a2)".

As appreciated from above, the present invention uses a direction value calculated in the direction calculation algorithm as a new metric instead of the distance, to configure the CBT. That is, the direction value between two nodes becomes gradually smaller and forward directions of the packet transmitted from the core node to the two nodes are regarded as one and the same thing to select the two nodes as the parent or child node. Through this way, the times of returning into the router 1 R1 can be reduced.

The core node selecting method is a passive method. There is also a method of a bootstrap mechanism, etc., but for conveniently embodying the present invention, the core node is designated and it is assumed that all nodes participating in the group acknowledge the core node by setting or have information on the node acknowledging the core node.

FIG. 7A to FIG. 7C, FIG. 8, FIG. 9A and FIG. 9B are views for describing the direction-based CBT according to an embodiment of the present invention, and in order to compare with the conventional distance-based CBT configuration, the following is a description of subscribing for the direction-based CBT in a sequence of nodes a, b, h and h1 in the network topology shown in FIG. 2.

Accordingly, a node-to-node distance shown in each of the drawings represent the network topology shown in FIG. 2 and the node-to-node distance shown in FIG. 3A. The node-to-node distance is earlier described in FIG. 3A.

Figure 7A:
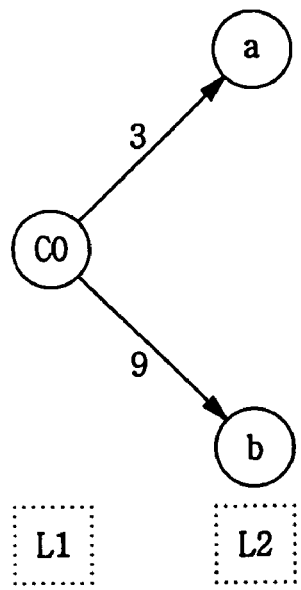
FIGS. 7A to 7C are views for describing the case of sub-scribing in a sequence of nodes a, b and h depending on a direction-metric-based CBT having a core node C0 according to an exemplary embodiment of the present invention.
Figure 7B:
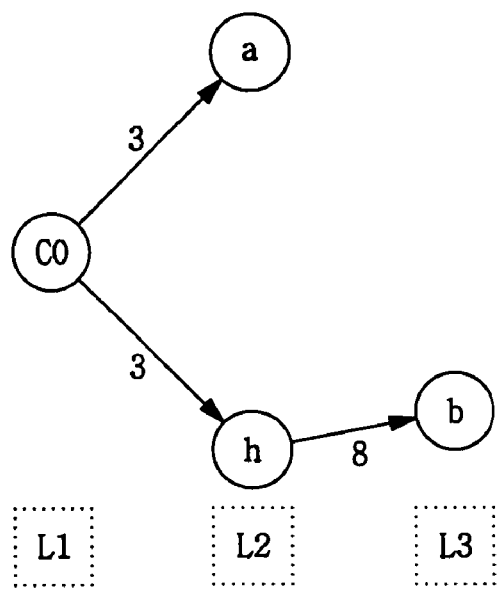
Figure 7C:
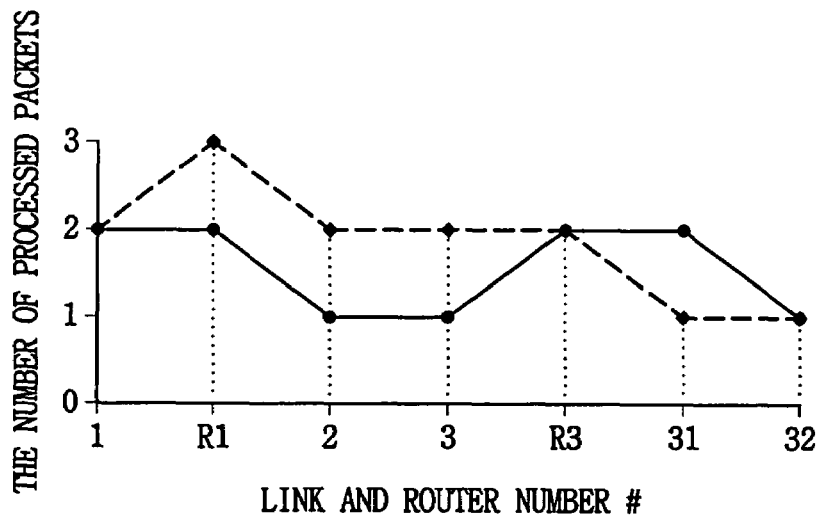

FIG. 7A represents the CBT before subscription of the node h, FIG. 7B represents the CBT after subscription of the node h, and FIG. 7C represents the number of the packets processed on each link and router for one multicast packet.

After the node h which desire to subscribe obtains information on child nodes a and b of the core node C0 from the core node C0 wherein the number of the maximum relay-able child nodes is two, the earlier described direction values "direction(h,a)[≈214.09]" and "direction(h,b)[≈41.37]" are calculated for the nodes a and b.

The node h transmits a CBT subscription request message including information on a small direction value to the node b to request the core node C0 of a first hierarchy of the parent node for a subscription. The core node C0 compares the value of the direction(h,b) of the received CBT subscription request message with the value of the direction(a,b)[≈71.57] between given child nodes received through a periodic hello message. As a result, "[direction(h,b)<direction(a,b)]" represents that the path of relaying the packet from the node h to the node b is an efficient path for avoiding the earlier described returning phenomenon.

Accordingly, the core node C0 allows the node h to subscribe to a new child node and requests for the given child node b to re-subscribe to a new parent node h by transmitting a flush message. According to this request, the node b subscribes to a second hierarchy of the parent node h to configure the CBT of FIG. 7B.

FIG. 7C represents the number of the packets processed on each link and router. In the drawing, the solid line shows the result of the direction-based CBT configuration according to the present invention, and the dotted line shows the result of the conventional distance-based CBT configuration. Describing the inventive result with reference to FIG. 7C, as shown in the solid line, the link #1 processes two packets, the router 1 R1 processes two packets, the link #2 processes one packet, the link #3 processes one packet, the router 3 R3 processes two packets, the link #31 processes two packets, and the link #32 processes one packet.

That is, describing a packet transmission path from the core node C0 to the node a with reference to FIGS. 2 and 7B, the path from the core node C0 to the node a is drawn in passing through the router 1 R1 via the link #1, and then via the link #2. (link #1, R1, link #2)

Describing the packet transmission path from the core node C0 to the node h, the path from the core node C0 to the node h is drawn in passing through the router 1 R1 via the link #1, and then passing through the router3 R3 via the link #3, and finally, via the link #31. (link #1, R1 link #3, R3, link #31)

Describing a packet transmission path from the node h to the node b, the path from the node h to the node b is drawn in passing through the router 3 R3 via the link #31, and then via the link #32. (R 3, link #31, link #32)

Accordingly, calculating the packet passage times by each link or router, the link #1 has two times, the router 1 R1 has two times, the link #2 has one time, the link #3 has one time, the router 3 R3 has two times, the link #31 has one time, and the link #32 has one time. These are illustrated using a solid line in FIG. 7C.

To the contrary, the result from the conventional distance-based CBT is compared with the packet passage times by each link or router, as comparably illustrated in a dotted line in FIG. 7C, wherein the link #1 has two times, the router 1 R1 has three times, the link #2 has two times, the link #3 has two times, the router 3 R3 has two times, the link #31 has one time, and the link #32 has one time. The result from the conventional distance-based CBT is earlier illustrated in FIG. 3D.

Figure 8:
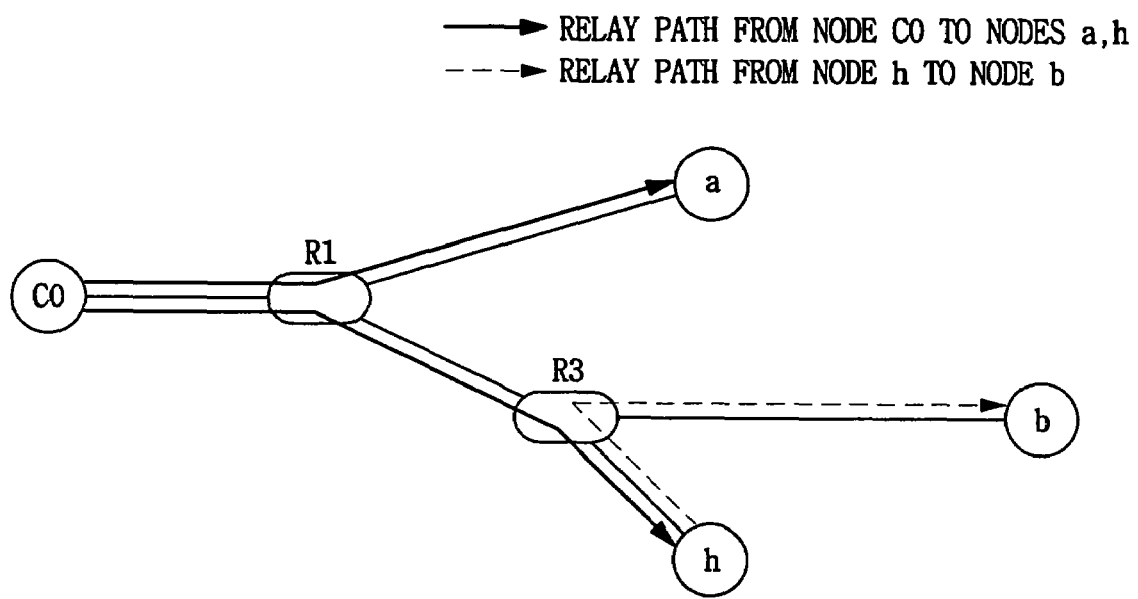
FIG. 8 is a view illustrating a relay path of a multicast packet in a direction-metric-based CBT according to an exemplary embodiment of the present invention.

FIG. 8 illustrates a relay path of the multicast packet in the direction-based CBT according to an embodiment of the present invention in the network topology shown in FIG. 2. A solid line represents the relay path from the node C0 to the nodes a, h, and a dotted line represents the relay path from the node h to the node b. This is compared with the relay path of the multicast packet in the conventional distance-based CBT shown in FIG. 4.

That is, since a returning phenomenon of the conventional distance-metric-based CBT is not caused for N multicast packets, on the router1 R1 is processed only 2*N packets, not 3*N packets. Even though the number of the packets processed on the link 31 is increased, the drawback of the conventional distance-metric-based CBT, that is, the packet convergence phenomenon on a specific router or link such as the router connected with the core node can be reduced in consequence.

Figure 9A:
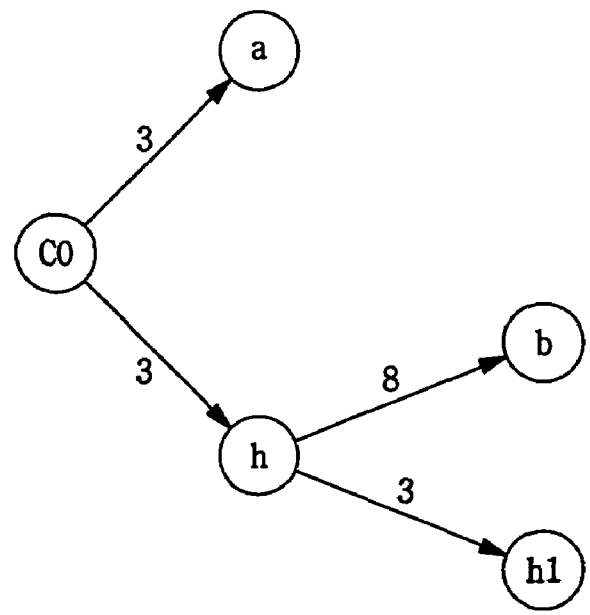
FIGS. 9A and 9B are views for describing the case of subscribing in a sequence of nodes a, b, h and h1 depending on a direction-metric-based CBT having a core node C0 according to an exemplary embodiment of the present inven-tion.
Figure 9B:
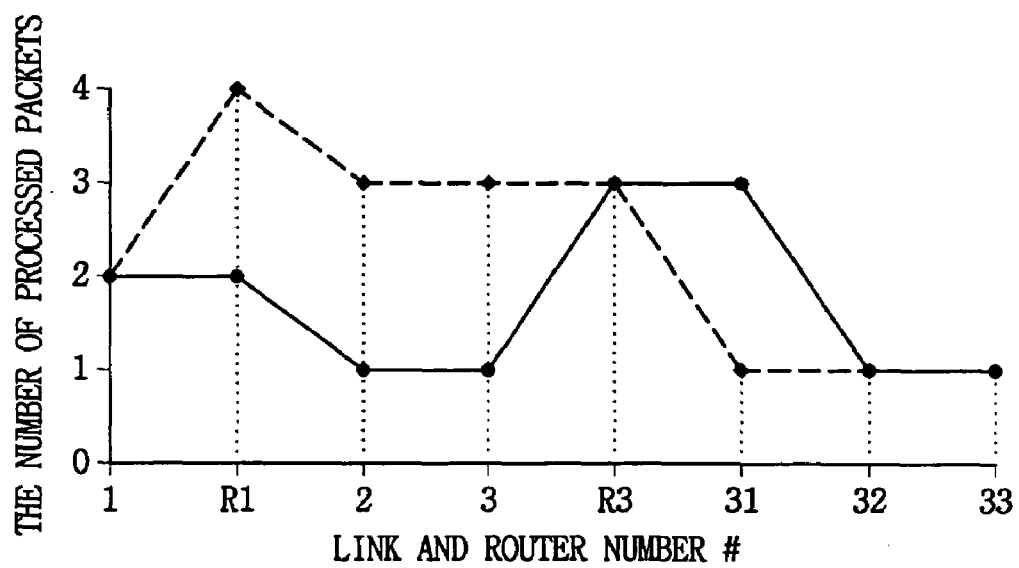

FIG. 9A represents the direction-metric-based CBT consisting of nodes C0, a, b, h and h1 according to the present invention in the network topology shown in FIG. 2, and FIG. 9B illustrates the number of packets processed on each link and router in the network of FIG. 9A. Referring to FIG. 9B, the link #1 processes two packets, the router 1 R1 processes two packets, the link #2 processes one packet, the link #3 processes one packet, the router 3 R3 processes three packets, the link #31 processes three packets, the link #32 processes one packet and the link #33 processes one packet.

That is, describing a packet transmission path from the core node C0 to the node a with reference to FIGS. 2 and 9A, the path from the core node C0 to the node a is drawn in passing through the router 1 R1 via the link #1, and then via the link #2. (link #1, R1, link #2)

Describing the packet transmission path from the core node C0 to the node h, the path from the core node C0 to the node b is drawn in passing through the router 1 R1 via the link

1, and then passing through the router3 R3 via the link #3, and finally, passing via the link #31. (link #1, R1, link #3, R3, link #31)

Describing a packet transmission path from the node h to the node b is the path from the node h to the node b is drawn in passing through the router 3 R3 via the link #31, and then passing via the link #32. (R3, link #31, link #32)

Describing a packet transmission path from the node h to the node h1, the path from the node h to the node h1 is drawn in passing through the router 3 R3 via the link #31, and then passing via the link #33. (R3, link #31, link #33)

Accordingly, calculating the packet passage times by each link or router, the link #1 has two times, the router 1 R1 has two times, the link #2 has one time, the link #3 has one time, the router 3 R3 has two times, the link #31 has three times, the link #32 has one time, and the link #33 has one time. These are illustrated using the solid line in FIG. 9B.

To the contrary, the result from the conventional distance-based CBT is compared with the packet passage times by each link or router, as comparably illustrated using a dotted line in FIG. 9B, wherein the link #1 has two times, the router 1 R1 has four times, the link #2 has three times, the link #3 has three times, the router 3 R3 has three times, the link #31 has one time, the link #32 has one time, and the link #33 has one time. These are earlier illustrated in FIG. 5B.

The direction-metric-based CBT subscription algorithm according to the present invention can be expressed as follows.

```
Procedure: JoinCBT(h)
Pi(h) ← C0
C(Pi(h)) ← WhoisChild(Pi(h))
while (num(C(Pi(h))) ≧ max(C(Pi(h)))
Find Ny s.t, direction (h, Ny) < direction(h, Nx), Nx, Ny ∈ C(Pi(h))
Find Nx, Nz s.t, direction (Nx, Ny) < direction (Nw, Nx),
        Nv, Nw, Nx, Ny ∈ C(Pi(h))
if (direction(h, Ny) > direction(Nx, Nz))
        h Join C(Pi(h))
        c (Nx, Nz) Quit C(Pi(h))
        c(Nx, Nz) Join C(p(Nx, Nz))
        return
else
        if (p(h, Ny)==h)
                h Join C(Pi(h))
                Ny Quit C(Pi(h))
                Ny Join C(h)
                return
        else
                Increment i, Pi(h) ← Ny
                C(Pi(h)) ← WhoisChild(Pi(h))
        end if
end if
end while
h Join C(Pi(h))
```

Describing this algorithm in detail is as follows.

Pi(h)←C0

C(Pi(h))←WhoisChild(Pi(h))//

Pi(h)←C0: When an arbitrary node h intends to subscribe to the CBT, $0^{th}$ parent node is taken as the core node C0.

C(Pi(h))←WhoisChild(Pi(h)): The node h requests information from the core node C0 on the child node of the core node C0 to input information on the received child node to the child node of the core node C0.

while (num(C(Pi(h)))≧max(C(Pi(h))): When the number of child nodes of the core node C0 is more than the maximum number of child nodes which can be housed, then the following procedure is performed.

Find Ny s.t, direction (h, Ny)<direction(h, Nx), Nx, Ny ∈ C(Pi(h)): The direction between the node h and an arbitrary node (the nodes Ny and Nx) is calculated to find out the node (Ny) that is the most adjacent to the node h.

Find Nx, Nz s.t, direction (Nx, Ny)<direction(Nw, Nx): The nodes having the most distant direction to each other is found from among the child nodes of the core node.

if(direction(h, Ny)>direction(Nx, Nz)): It is determined whether the direction of the node h being intended to subscribe and the most adjacent node Ny to the node h is larger than the direction of the most far-distant node from among the child nodes of the core node.

h Join C(Pi(h)): If so, since there is no relation with each other, the node h should be subscribed to the child node.

c(Nx, Nz) Quit C(Pi(h)): The most distant node from the core node from among the child nodes Nx and Ny of the core node should be withdrawn from the core node.

c(Nx, Nz) Join C(p(Nx, Nz)): The withdrawn node should be subscribed to the child node of the most adjacent node to the core node from among the nodes Nx and Ny.

else if (p(h, Ny)==h): If a node adjacent to the core node between the nodes h and Ny is the node h, h Join C(Pi(h)): the node h is allowed to subscribe to the child node of the core node Ny Quit C(Pi(h)): the node Ny is withdrawn from the child node of the core node Ny Join C(h): the node Ny should be subscribed to the child node of the core node.

Increment i, Pi(h)←Ny

C(Pi(h))←WhoisChild(Pi(h): The hierarchy is increased to again perform a subscription procedure to the node Ny.

Next, a reconfiguration of the CBT will be described.

After an arbitrary node subscribes to the CBT, the arbitrary node periodically transmits and receives the hello packet to and from a brother node and the parent node so that the states of the parent node, the child node and the brother node can be confirmed. When the hello packet is not received for a predetermined time, it is assumed that there is an error in a counterpart Describing a transmission and reception of the hello packet with the brother node, the hello packet having transmission number information on the multicast packet recently received is periodically exchanged and analyzed with the brother node to confirm the calculated direction value with the brother node and a communication error with the parent node. As a result of confirming, when a temporary error is found out in the communication with the parent node, the packet can be relayed and received from the brother node having the smallest direction value. As described above, using a periodic communication with the brother node, a mesh structure between the brother nodes can be configured in the CBT.

Describing a transmission and reception of the hello packet with the parent node, information on the transmission number of the multicast packet recently received, direction information with the brother node, and direction information with the child node in case of the existence of the child node are periodically transmitted to the parent node. At the same time, information on the brother nodes and information on uncle nodes are received from the parent node.

When the uncle node has a direction value smaller than that of the parent node, the uncle node is re-subscribed and the former parent node is withdrawn.

On the other hand, when the transmission number of the multicast packet received by the exchange of the hello packet with the brother node is compared and it is determined that the multicast packet has a smaller transmission number than that of the brother node, it is assumed that an error has been generated on the link with the parent node, and the brother node is requested to provide the packet relay. When the hello packet is not received from the parent node for a predetermined time or a link error is maintained in the parent node, a grandfather node (Pi(h), i=i-1 in the drawing) is re-subscribed.

On the other hand, when the hello packet is not received from the child node for a predetermined time, it is assumed that an error has been generated in the child node and is maintaining a waiting state for a predetermined time for a grandson node to re-subscribe. If the number of current child nodes is less than the number of house-able child nodes, the direction of the grandson node and the direction of the child node received from the child node are compared to re-subscribe the grandson node representing the largest direction value to the child node, to thereby reduce the hierarchy of the CBT and reduce the relay latency time.

If so, the inventive direction-metric-based CBT overlay multicast and the conventional distance-metric-based CBT overlay multicast are performed such that information having the packet converged on a corresponding router in the procedure of relaying one multicast packet from the core node to the overall CBT is compared to evaluate a performance.

Dividing mainly into two ways, the number of processed packets of the router to which the core node affecting the performance of the overall CBT is connected and the number of processed packets of the router processing the most packets besides the core node are calculated to evaluate the performance.

Tables 2 to 5 represent a subscription node and a subscription sequence in an experiment of a subscription to the CBT.

TABLE 2

| | Seq. | | | | | | | | | |
|---|---|---|---|---|---|---|---|---|---|---|
| | 1 | 2 | 3 | 4 | 5 | 6 | 7 | 8 | 9 | 10 |
| Exp. 1 | 17 | 32 | 29 | 37 | 13 | 3 | 36 | 8 | 1 | 19 |
| Exp. 2 | 40 | 38 | 17 | 32 | 37 | 30 | 18 | 13 | 3 | 21 |
| Exp. 3 | 16 | 6 | 24 | 10 | 3 | 30 | 29 | 28 | 2 | 1 |
| Exp. 4 | 28 | 31 | 15 | 1 | 8 | 33 | 40 | 10 | 20 | 7 |
| Exp. 5 | 4 | 29 | 22 | 20 | 35 | 6 | 37 | 15 | 14 | 30 |

TABLE 3

| | Seq. | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Exp. 1 | 25 | 27 | 39 | 35 | 33 | 20 | 1 | 8 | 34 | 7 | 23 | 36 | 26 | 31 | 5 |
| Exp. 2 | 12 | 24 | 10 | 16 | 1 | 22 | 31 | 34 | 35 | 9 | 38 | 13 | 25 | 17 | 33 |
| Exp. 3 | 10 | 6 | 27 | 38 | 30 | 12 | 14 | 1 | 4 | 33 | 31 | 35 | 29 | 11 | 5 |
| Exp. 4 | 22 | 14 | 25 | 33 | 29 | 11 | 13 | 6 | 2 | 16 | 23 | 36 | 30 | 32 | 19 |
| Exp. 5 | 4 | 6 | 19 | 11 | 22 | 39 | 5 | 23 | 13 | 38 | 14 | 33 | 21 | 27 | 7 |

TABLE 4

| | Seq. | | | | | | | | | | | | | | | | | | | |
|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 |
| Exp. 1 | 7 | 23 | 13 | 2 | 17 | 40 | 25 | 9 | 30 | 16 | 34 | 6 | 14 | 5 | 33 | 32 | 37 | 11 | 39 | 35 |
| Exp. 2 | 25 | 6 | 10 | 37 | 14 | 28 | 20 | 12 | 18 | 36 | 27 | 9 | 38 | 8 | 40 | 29 | 35 | 22 | 24 | 11 |
| Exp. 3 | 3 | 12 | 18 | 2 | 19 | 7 | 5 | 15 | 28 | 36 | 26 | 37 | 39 | 8 | 35 | 31 | 4 | 23 | 38 | 20 |
| Exp. 4 | 34 | 22 | 4 | 17 | 15 | 27 | 6 | 5 | 21 | 35 | 36 | 7 | 23 | 38 | 31 | 37 | 28 | 2 | 9 | 29 |
| Exp. 5 | 23 | 27 | 4 | 8 | 20 | 36 | 18 | 17 | 14 | 39 | 38 | 26 | 12 | 5 | 19 | 1 | 29 | 37 | 24 | 33 |

TABLE 5

| | Seq. | | | | | | | | | | | | | | | | | | | | | | | | |
|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| Exp. 1 | 37 | 35 | 2 | 24 | 6 | 15 | 23 | 13 | 39 | 38 | 1 | 19 | 22 | 20 | 32 | 26 | 12 | 11 | 16 | 7 | 10 | 33 | 17 | 40 | 34 |
| Exp. 2 | 5 | 26 | 1 | 20 | 3 | 8 | 6 | 35 | 4 | 21 | 7 | 19 | 40 | 25 | 28 | 33 | 34 | 11 | 39 | 17 | 18 | 16 | 30 | 9 | 10 |
| Exp. 3 | 21 | 9 | 40 | 17 | 10 | 12 | 4 | 1 | 6 | 34 | 2 | 5 | 29 | 32 | 7 | 38 | 24 | 26 | 15 | 3 | 35 | 39 | 28 | 16 | 13 |
| Exp. 4 | 29 | 23 | 12 | 21 | 1 | 9 | 13 | 26 | 5 | 34 | 11 | 20 | 14 | 15 | 38 | 10 | 2 | 39 | 37 | 31 | 19 | 27 | 36 | 28 | 4 |
| Exp. 5 | 34 | 11 | 40 | 37 | 7 | 35 | 20 | 30 | 28 | 16 | 25 | 17 | 6 | 9 | 13 | 5 | 15 | 29 | 39 | 38 | 36 | 8 | 2 | 14 | 33 |

An experiment procedure is executed increasing the number of multicast group member nodes in the following network. The group member node is optionally selected using the function of "rand( )" as shown in Tables 2 to 5, and also is subscribed to the CBT in an optional sequence. Five experiments are repeated for the respective number of member nodes, and an average is obtained for the result of the repetitive experimented overlay multicast to use as the resultant value of the experiment.

The first experiment is a comparison on a ring-shaped topology network.

Figure 10:
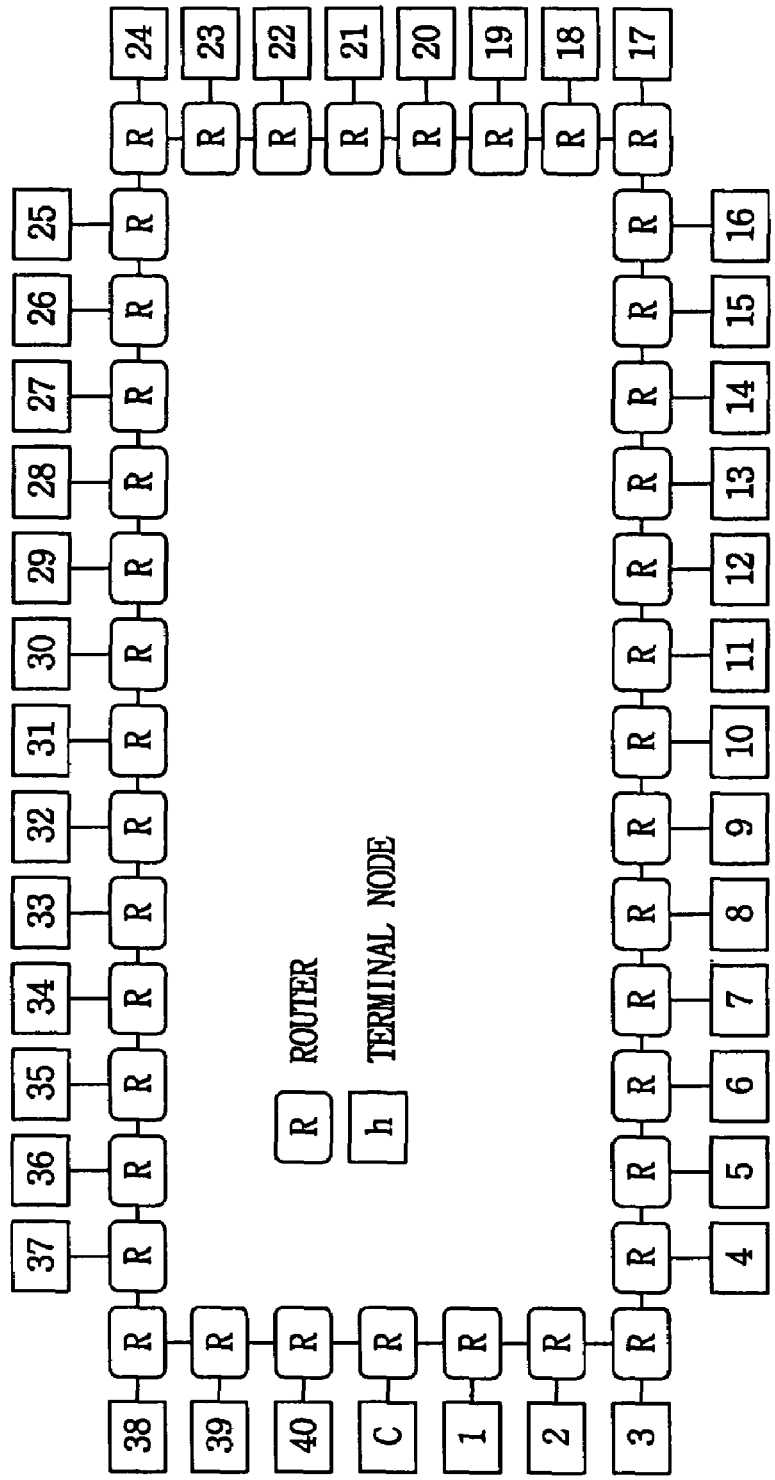
FIG. 10 is a view illustrating a configuration of a ring-shaped topology network.

FIG. 10 is a view illustrating a configuration of the ring-shaped topology network. In the ring-shaped topology network consisted of 41 routers and the terminal nodes as shown in FIG. 10, an experiment is performed in which 10, 15, 20 and 25 terminal nodes subscribe to the CBT depending on the sequences shown in Tables 2 to 5.

Figure 11A:
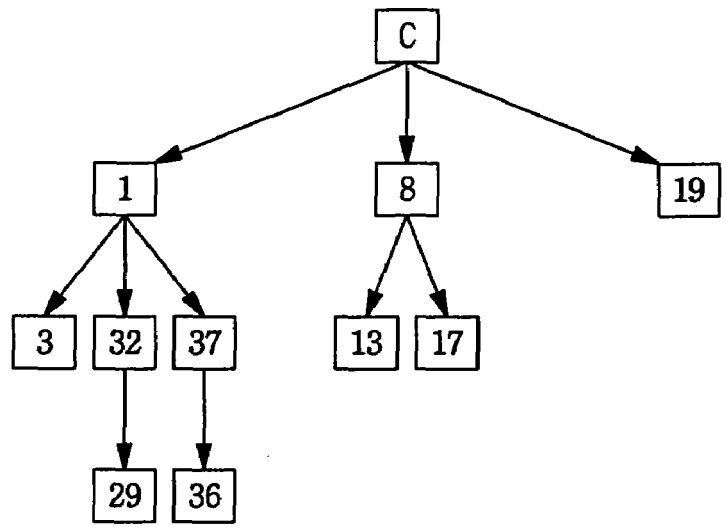
FIGS. 11A and 11B are views illustrating a configuration of a distance-metric-based CBT for a first experiment of Table 2 and a direction-metric-based CBT according to an exemplary embodiment of the present invention.
Figure 11B:
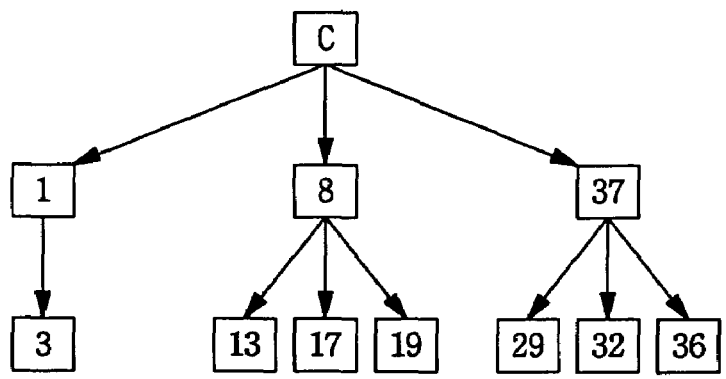

FIG. 11A illustrates a configuration of the distance-metric-based CBT for the first experiment of Table 2, and FIG. 11B illustrates an example of the direction-metric-based CBT according to an exemplary embodiment of the present invention.

Referring to FIGS. 11A and 11B, it can be appreciated that the hierarchy of the inventive direction CBT is less by one than that of the conventional distance CBT. Accordingly, the relay procedure for copying the packet for transmission is shortened so that it can transmit the packet at the highest speed possible.

Figure 12:
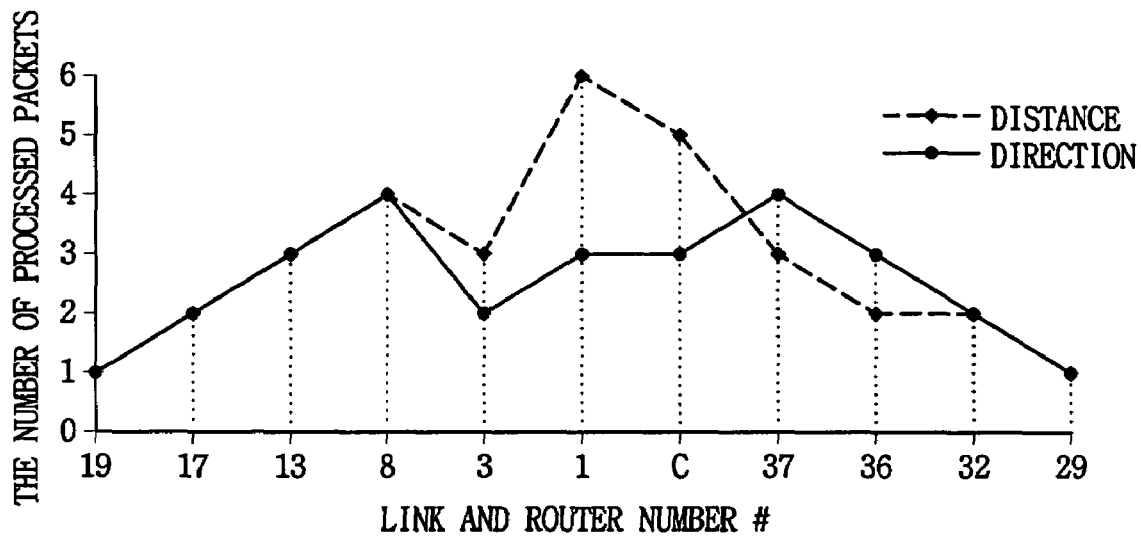
FIG. 12 is a graph of comparing the number of packets processed on each of routers connected with terminal nodes in FIGS. 11A and 11B.

FIG. 12 is a graph of comparing the number of the packets processed on each of the routers connected with terminal nodes in FIGS. 11A and 11B. In the drawing, the dotted line represents the distance-based CBT, and the solid line represents the direction-based CBT. Referring to FIG. 12, it can be appreciated that the distance CBT has the packet converged on the routers in which the core node is connected with the node 1. In comparison, the direction CBT represents the relatively inactive number of processed packets. This is because, in the distance CBT of FIG. 11A, an actual position of each of the nodes and a position of the node on the CBT are not accorded, to return the packets relayed from the node 1 to the nodes 32 and 37 through the path of transmitting the packet from a former core node to the node 1.

Figure 13A:
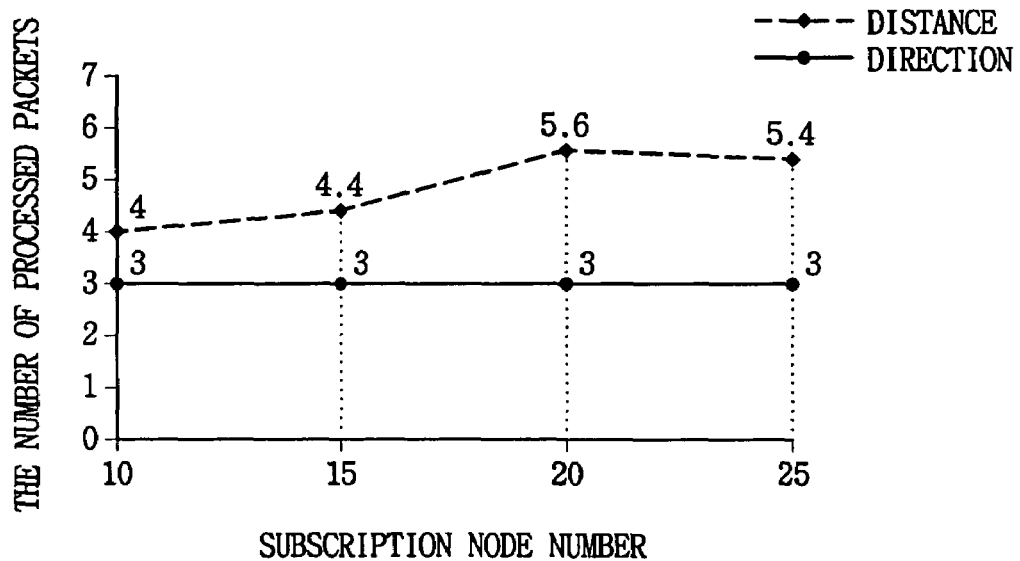
FIGS. 13A and 13B are graphs illustrating the number of average processed packets as a result of experimenting with the case of a subscription of each of nodes to a CBT in a first experiment.
Figure 13B:
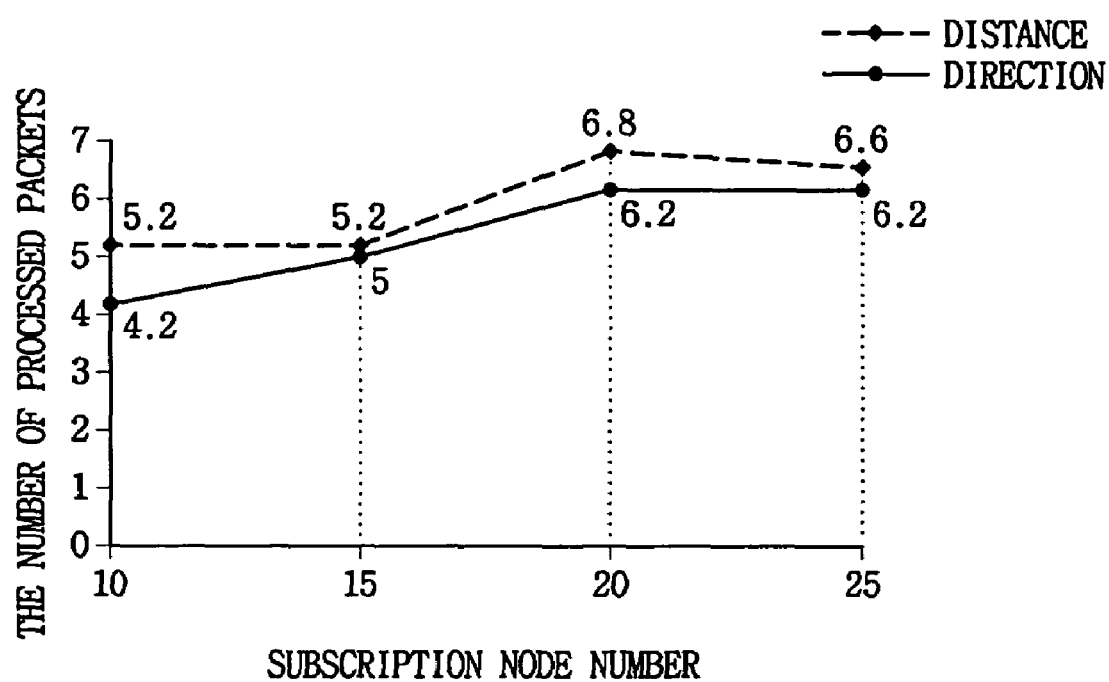

FIGS. 13A and 13B are graphs illustrating the number of average processed packets as a result of experiments performed with the subscription of each of the nodes to the CBT in the first experiment. FIG. 13A represents the average number of packets processed by the number of subscription nodes on the router connected with the core node, and FIG. 13B represents the average number of packets processed by the node number of the router processing the maximum packet.

In the graphs of FIGS. 13A and 13B, it can be appreciated that the number of packets processed on the router to which the core node is connected is reduced by about 38% in the CBT direction as compared to the distance CBT, and the number of packets processed of the router processing the maximum number of packets is also reduced by about 10%. Particularly, due to the reduction of the number of processed packets on the router connected to the core node affecting the total multicast performance of the CBT, a more stable multicast communication can be expected.

The second experiment is a comparison on the linear topology network.

Figure 14:
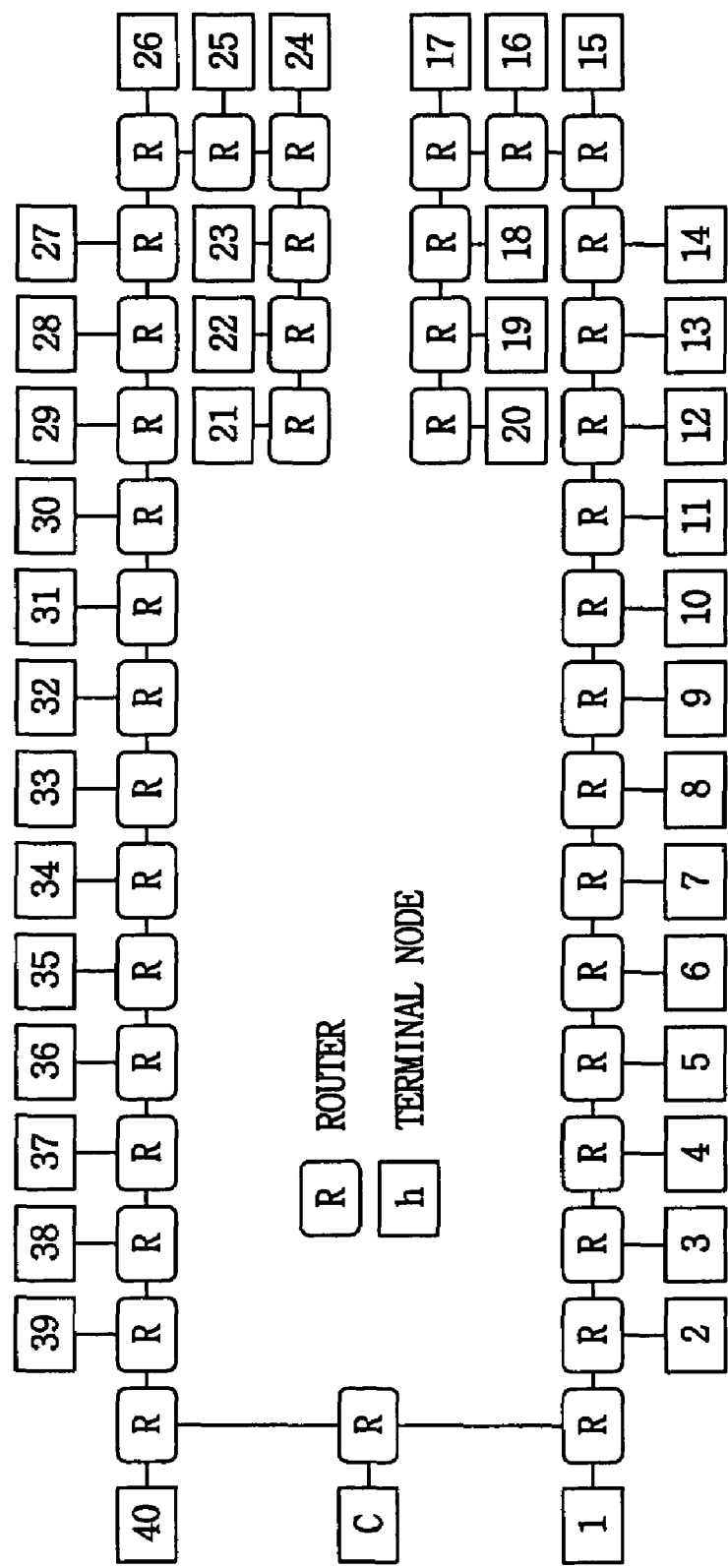
FIG. 14 is a view illustrating a configuration of a linear topology network.

FIG. 14 is a view illustrating a configuration of the linear topology network. A linear topology network consisting of 41 routers and the terminal nodes as shown in FIG. 14, are as in the first experiment.

Figure 15A:
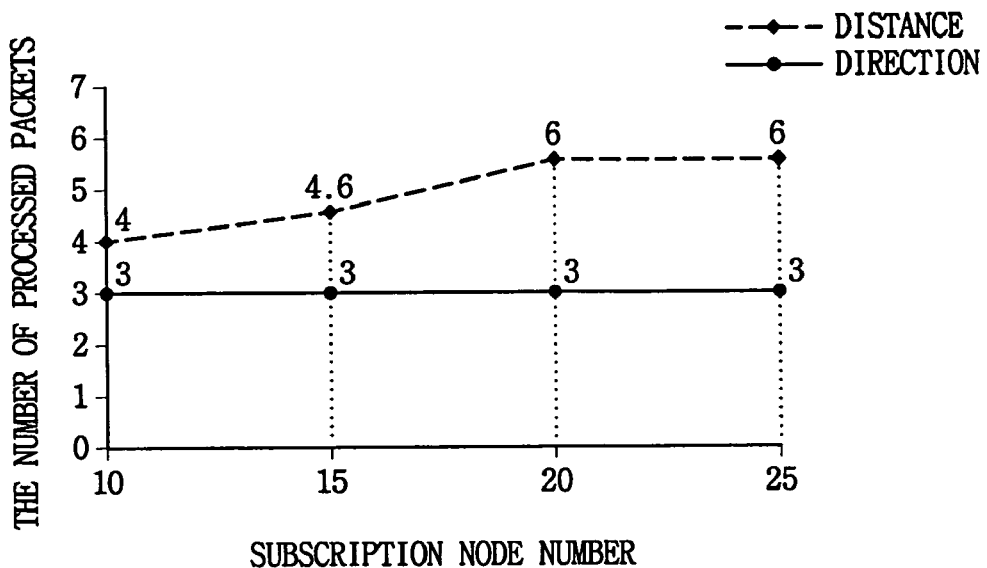
FIGS. 15A and 15B are graphs illustrating the number of average processed packets as a result of experimenting with the case of a subscription of each of nodes to a CBT in a second experiment.
Figure 15B:
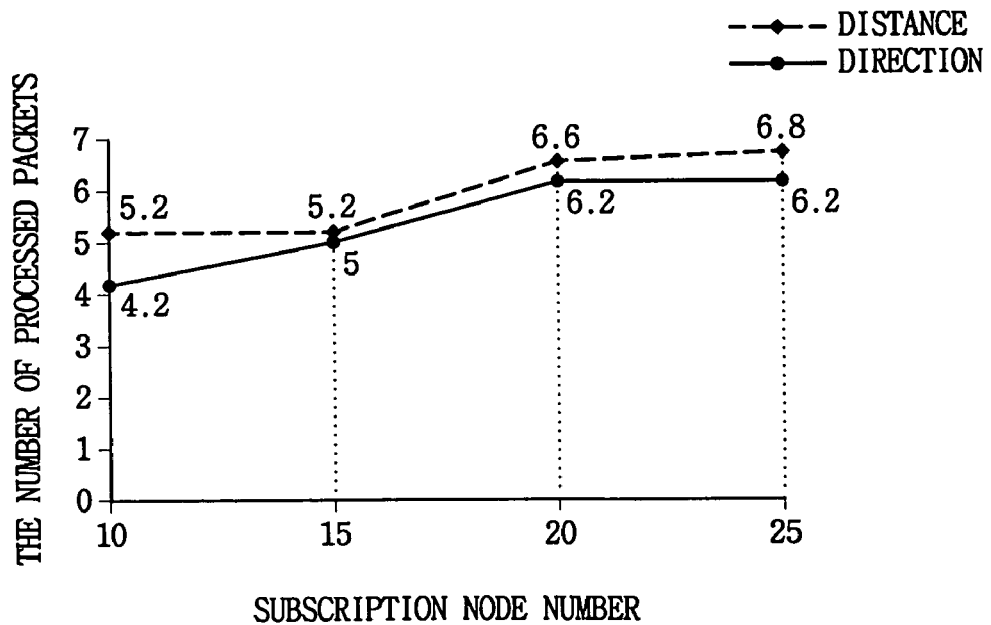

FIGS. 15A and 15B are graphs illustrating the average number of packets processed as a result of experimenting with the subscription to the CBT by each of the nodes in the second experiment. FIG. 15A represents the average number of packets processed by the number of subscription nodes on the router connected to the core node, and FIG. 15B represents the average number of packets processed by the number of nodes of the router processing the maximum number of packets.

Referring to FIGS. 15A and 15B, it can be appreciated that the number of the packets processed on the router to which the core node is connected is reduced by about 42% on average in the CBT direction in comparison to the distance CBT, and the number of the packets processed by the router processing the maximum number of packets is also reduced by about 10% on average.

The third experiment is a comparison on the star-shaped topology network.

Figure 16:
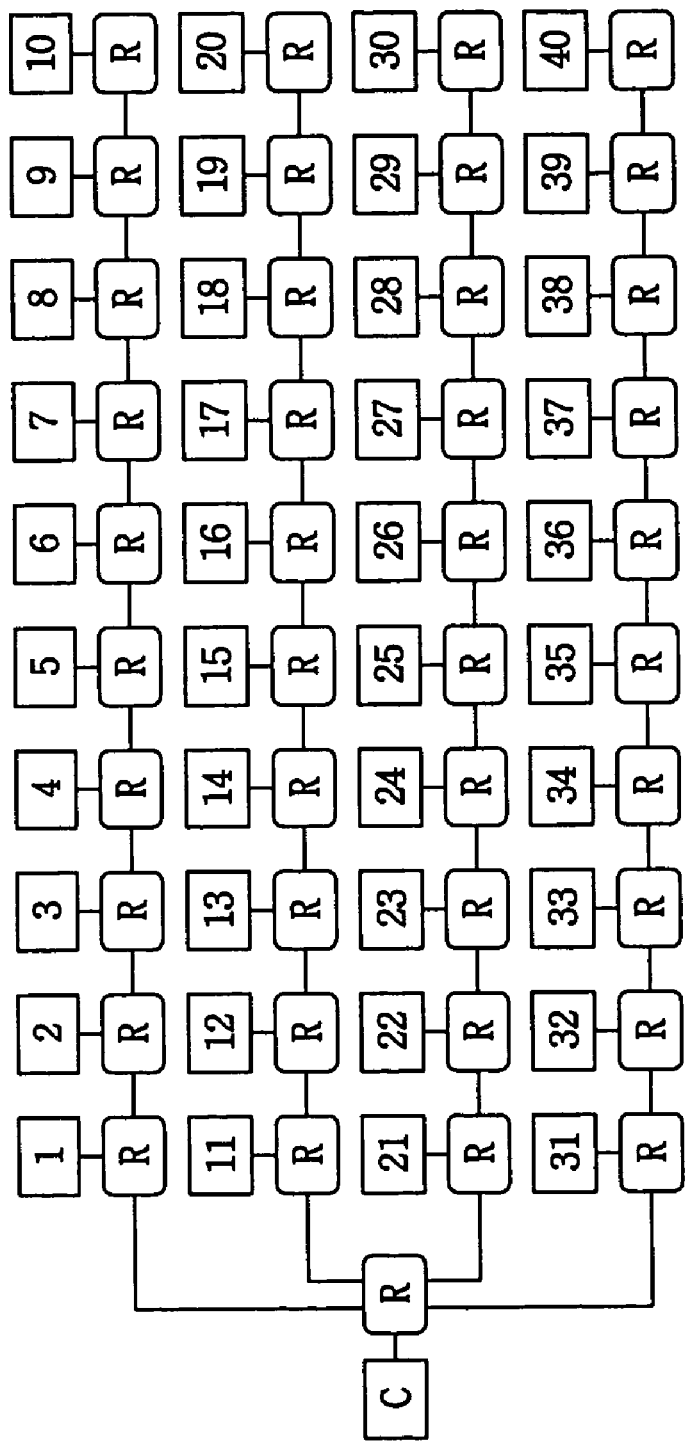
FIG. 16 is a view illustrating a configuration of a star-shaped topology network.

FIG. 16 is a view illustrating a configuration of the star-shaped topology network. The star-shaped topology network consisting of 41 routers and the terminal nodes as shown in FIG. 16, are the same as in the first experiment.

Figure 17A:
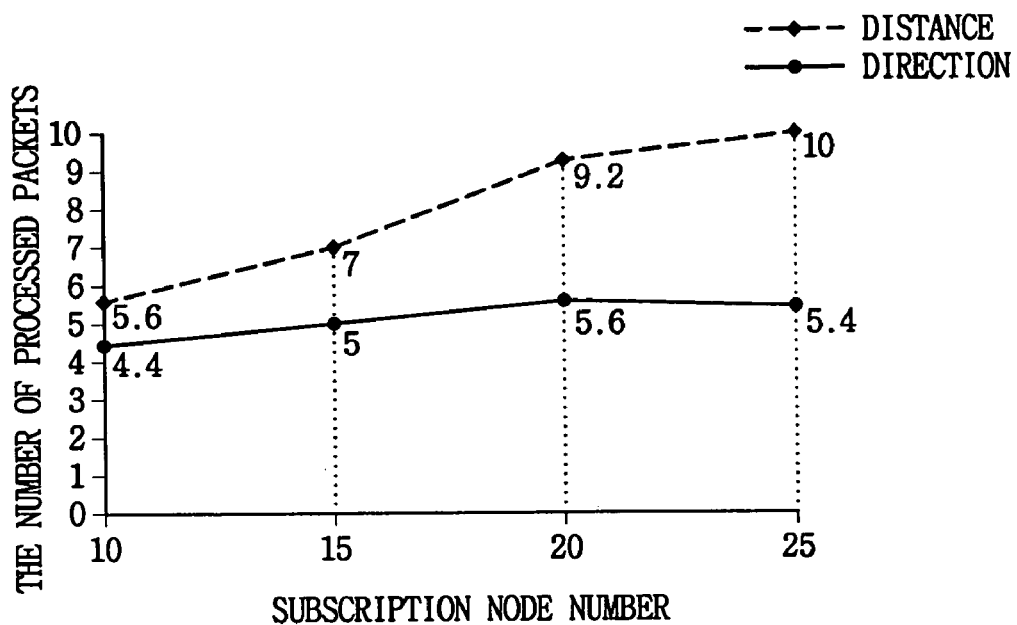
FIGS. 17A and 17B are graphs illustrating the number of average processed packets as a result of experimenting with the case of a subscription of each of nodes to a CBT in a third experiment.
Figure 17B:
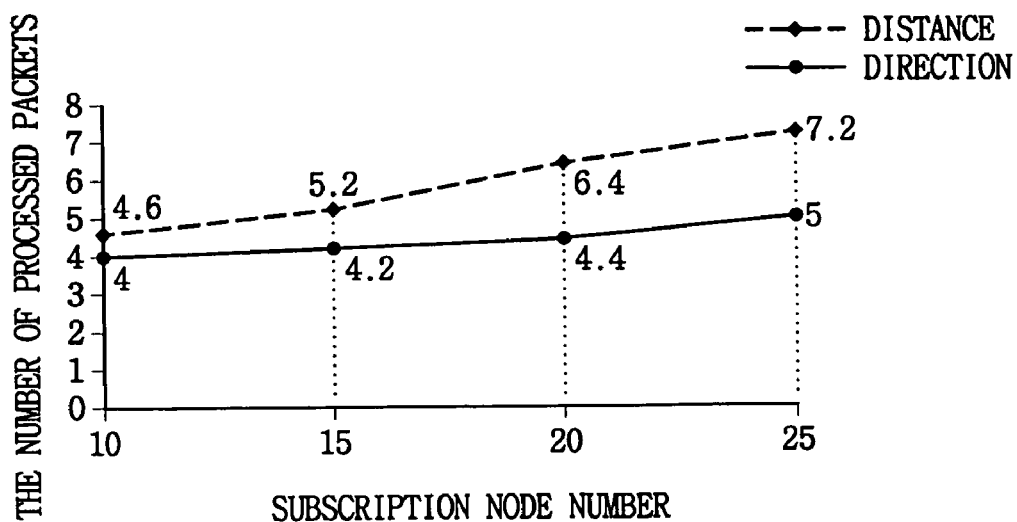

FIGS. 17A and 17B are graphs illustrating the average number of packets processed as a result of experimenting with the subscription to the CBT by each of the nodes in the third experiment. FIG. 17A represents the average number of packets processed by the number of subscription nodes on the router connected to the core node, and FIG. 17B represents the average number of packets processed by the number of nodes of the router processing the maximum number of packets.

Referring to FIGS. 17A and 17B, it can be appreciated that the number of packets processed on the router to which the core node is connected is reduced by about 34% on average in the CBT direction in comparison to the distance CBT, and the number of packets processed by the router processing the maximum number of packets is also reduced by about 25% on average and at the same time. As a result, the hierarchy of the CBT can be reduced.

As is apparent from the above description, the present invention provides the overlay multicast using the direction-metric-based CBT. As described above, the CBT is created considering the relay forward direction of the packet to solve the drawback in that the packet is converged on a specific router in the conventional distance-metric-based CBT.

As a result, the possibility of the occurrence of congestion can be reduced in the specific router to provide a more stable multicast.

Although exemplary embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A method of configuring a direction-based Core Based Tree (CBT) for a CBT-based overlay multicast, the method comprising:

requesting and receiving information on child nodes pre-subscribed to a core node at an arbitrary terminal node to be subscribed to the CBT;

calculating a direction between the terminal node and each of the child nodes and transmitting information on the child node having a minimum resultant value to the core node along with a subscription request message; and comparing the calculated direction between a corresponding child node and the terminal node with the calculated direction between child nodes pre-subscribed to the core node at the core node and subscribing the terminal node to either the child node or a parent node of the corresponding child node in accordance with the comparison to configure the CBT;

wherein calculating the direction comprises using internal and external angles and a height of a triangle having respective distances between the core node and two arbitrary nodes adjacent to the core as respective sides of the triangle.

2. The method according to claim 1, further comprising periodically transmitting and receiving a hello packet at the core node and the terminal node to and from the parent node, the child node and a brother node to confirm a state of the corresponding node and reconfiguring the configured CBT in response to the confirmed state of the corresponding node.

3. The method according to claim 1, wherein calculating the direction comprises using the formula:

$$\text{direction}=(\alpha+\beta)*y$$

wherein the triangle has nodes a1, C0 and a2, C0 being a core node, and a1 and a2 being arbitrary nodes, C0 and a2 forming a bottom side of the triangle, "α" being an internal angle formed by a side C0a1 and a side C0a2 of the triangle; "β" being an external angle formed by the side C0a1 and a side a1a2 of the triangle, "y" being a height of the triangle, and "direction" being the calculated direction.

4. The method according to claim 1, wherein calculating the direction further comprises determining that the child node having a minimum resultant value and the terminal node have a same forwarding direction of packets from the core node, the terminal node being determined to be either a child node or a parent node of the corresponding child node.

5. The method according to claim 1, wherein:
when the resultant value of calculating the direction between the corresponding child node and the terminal node is smaller than the resultant value of calculating the direction between the pre-subscribed child nodes at the core node, the terminal node is subscribed to the child node of the core node and a message is transmitted to the pre-subscribed child node to re-subscribe to the child node of the terminal node; and
the pre-subscribed child node withdraws from the core node and subscribes to the child node of the terminal node in response to the message.

6. A program storage device, readable by a machine, tangibly embodying a program of instructions executable by the machine to perform a method of configuring a direction-based Core Based Tree (CBT) for a CBT-based overlay multicast, the method comprising:
requesting and receiving information on child nodes pre-subscribed to a core node at an arbitrary terminal node to be subscribed to the CBT;
calculating a direction between the terminal node and each of the child nodes and transmitting information on the child node having a minimum resultant value to the core node along with a subscription request message; and
comparing the calculated direction between a corresponding child node and the terminal node with the calculated direction between child nodes pre-subscribed to the core node at the core node and subscribing the terminal node to either the child node or a parent node of the corresponding child node in accordance with the comparison to configure the CBT;
wherein calculating the direction comprises using internal and external angles and a height of a triangle having respective distances between the core node and two arbitrary nodes adjacent to the core as respective sides of the triangle.

7. The program storage device according to claim 6, the method further comprising periodically transmitting and receiving a hello packet at the core node and the terminal node to and from the parent node, the child node and a brother node to confirm a state of the corresponding node and reconfiguring the configured CBT in response to the confirmed state of the corresponding node.

8. The program storage device according to claim 6, wherein calculating the direction comprises using the formula:

$$\text{direction}=(\alpha+\beta)*y$$

wherein the triangle has nodes a1, C0 and a2, C0 being a core node, and a1 and a2 being arbitrary nodes, C0 and a2 forming a bottom side of the triangle, "α" being an internal angle formed by a side C0a1 and a side C0a2 of the triangle; "β" being an external angle formed by the side C0a1 and a side a1a2 of the triangle, "y" being a height of the triangle, and "direction" being the calculated direction.

9. The program storage device according to claim 6, wherein calculating the direction further comprises determining that the child node having a minimum resultant value and the terminal node have a same forwarding direction of packets from the core node, the terminal node being determined to be either a child node or a parent node of the corresponding child node.

10. The program storage device according to claim 6, wherein:
when the resultant value of calculating the direction between the corresponding child node and the terminal node is smaller than the resultant value of calculating the direction between the pre-subscribed child nodes at the core node, the terminal node is subscribed to the child node of the core node and a message is transmitted to the pre-subscribed child node to re-subscribe to the child node of the terminal node; and
the pre-subscribed child node withdraw from the core node and subscribes to the child node of the terminal node in response to the message.

* * * * *